(12) United States Patent
Beriwal et al.

(10) Patent No.: US 10,628,526 B2
(45) Date of Patent: Apr. 21, 2020

(54) PROVIDING SUGGESTED DIAGRAMMATIC REPRESENTATIONS OF USER ENTERED TEXTUAL INFORMATION

(71) Applicant: Microsoft Technology Licensing, LLC, Redmond, WA (US)

(72) Inventors: Girdhar Beriwal, Redmond, WA (US); Kailas Lokhande, Redmond, WA (US); Maria del Mar Gines Marin, Redmond, WA (US); Hany Gerges, Redmond, WA (US); Christopher Maloney, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/638,013

(22) Filed: Jun. 29, 2017

(65) Prior Publication Data
US 2018/0341638 A1 Nov. 29, 2018

Related U.S. Application Data

(60) Provisional application No. 62/511,868, filed on May 26, 2017.

(51) Int. Cl.
| | | |
|---|---|---|
| *G06F 17/27* | (2006.01) | |
| *G06F 17/24* | (2006.01) | |
| *G06K 9/20* | (2006.01) | |
| *G06F 17/21* | (2006.01) | |
| *G06Q 10/10* | (2012.01) | |

(Continued)

(52) U.S. Cl.
CPC ........ *G06F 17/2785* (2013.01); *G06F 17/211* (2013.01); *G06F 17/24* (2013.01); *G06K 9/2081* (2013.01); *G06F 3/167* (2013.01); *G06Q 10/10* (2013.01)

(58) Field of Classification Search
CPC .... G06F 17/2785; G06F 17/24; G06F 17/211; G06F 17/241; G06F 3/167; G06K 9/2081; G06Q 10/10
See application file for complete search history.

(56) References Cited

U.S. PATENT DOCUMENTS

| | | |
|---|---|---|
| 7,139,004 B2 | 11/2006 | Saund et al. |
| 7,379,074 B2 | 5/2008 | Gerhard et al. |
| 7,469,380 B2 | 12/2008 | Wessling et al. |

(Continued)

OTHER PUBLICATIONS

"About PowerPoint Designer", https://support.office.com/en-us/article/About-PowerPoint-Designer-53c77d7b-dc40-45c2-b684-81415eac0617?ui=en-US&rs=en-US&ad=US, Retrieved on: Mar. 8, 2017, 8 pages.

(Continued)

*Primary Examiner* — Quoc A Tran

(57) ABSTRACT

A suggestion service is disclosed herein that provides suggested diagrammatic representations of textual information in content. The suggestion service receives a request for a suggested diagrammatic representation of the textual information included in a content item. The suggestion service also identifies a layout for the suggested diagrammatic representation based on a type of the textual information. The suggestion service further produces the suggested diagrammatic representation of the textual information based on the layout. The suggestion service replies to the request with the suggested diagrammatic representation(s).

18 Claims, 12 Drawing Sheets

(51) Int. Cl.
*G06F 3/16* (2006.01)
*G06F 17/00* (2019.01)

(56) References Cited

U.S. PATENT DOCUMENTS

| | | | |
|---|---|---|---|
| 7,747,944 B2 | 6/2010 | Gerhard et al. | |
| 2013/0218872 A1* | 8/2013 | Jehuda | G06F 16/951 |
| | | | 707/722 |
| 2014/0380171 A1 | 12/2014 | Maloney et al. | |
| 2015/0007005 A1 | 1/2015 | Edge et al. | |
| 2015/0077419 A1* | 3/2015 | Abuelsaad | G06T 11/206 |
| | | | 345/440 |
| 2015/0277726 A1 | 10/2015 | Maloney et al. | |
| 2015/0339269 A1* | 11/2015 | Konchitsky | G06F 17/212 |
| | | | 715/211 |
| 2016/0092428 A1 | 3/2016 | Ilic et al. | |

OTHER PUBLICATIONS

Waldron, Spencer, "The Presentation Format That Lights Up Your Neurons", https://blog.prezi.com/presentation-format-lights-neurons-2/, Published on: Feb. 22, 2017, 11 pages.

\* cited by examiner

PROVIDING SUGGESTED DIAGRAMMATIC REPRESENTATIONS OF USER ENTERED TEXTUAL INFORMATION

RELATED APPLICATIONS

This application is related to, and claims priority to, U.S. Provisional Patent Application No. 62/511,686, filed on May 26, 2017, entitled "PROVIDING SUGGESTED DIAGRAMMATIC REPRESENTATIONS," and which is hereby incorporated by reference in its entirety.

TECHNICAL BACKGROUND

Users may create papers, presentations, spreadsheets, or other documents to convey information to an audience. Users may wish to add diagrammatic representations of their information to their documents to their documents so that viewers can quickly and easily digest the information presented. SmartArt® from Microsoft® is one example of a software component for inserting diagrammatic representations.

SmartArt® or similar software components or plug-ins allow users to choose from different pre-generated and pre-loaded diagrammatic representations, such as pyramid lists, basic processes, and continuous cycles. However, the diagrammatic representations then have to be edited to include the information that the user is intending to convey. For example, a user would insert a basic process graphic for a process and would then have to edit the graphic to include the steps in the process.

Users may use the formatting and editing tools within each individual software application to create their graphics. From a usability perspective, such tools may be helpful but can be cumbersome to work with. For example, users' proficiency using such programs may vary. Even for advanced users, creating and editing such graphics can be time consuming and error prone.

OVERVIEW

Technology is disclosed herein in support of a suggestion service that provides suggested diagrammatic representations to users. The suggested diagrammatic representations may be added to documents such as papers, presentations, spreadsheets, or other types of documents.

In an implementation, a suggestion service provides suggested diagrammatic representations of textual information in a content item. The content item may be a presentation slide, word processing, spreadsheet or other type of content item. The suggestion service receives a request for a suggested diagrammatic representation of the textual information included in the content item. Textual information may include entered text and well as non-textual input such as new lines and tabs. The suggestion service determines a type of the textual information and identifies a layout for the suggested diagrammatic representation based on the determined type of the textual information. The suggestion service further produces the suggested diagrammatic representation of the textual information based on the layout. The suggestion service replies to the request with the suggested diagrammatic representation.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
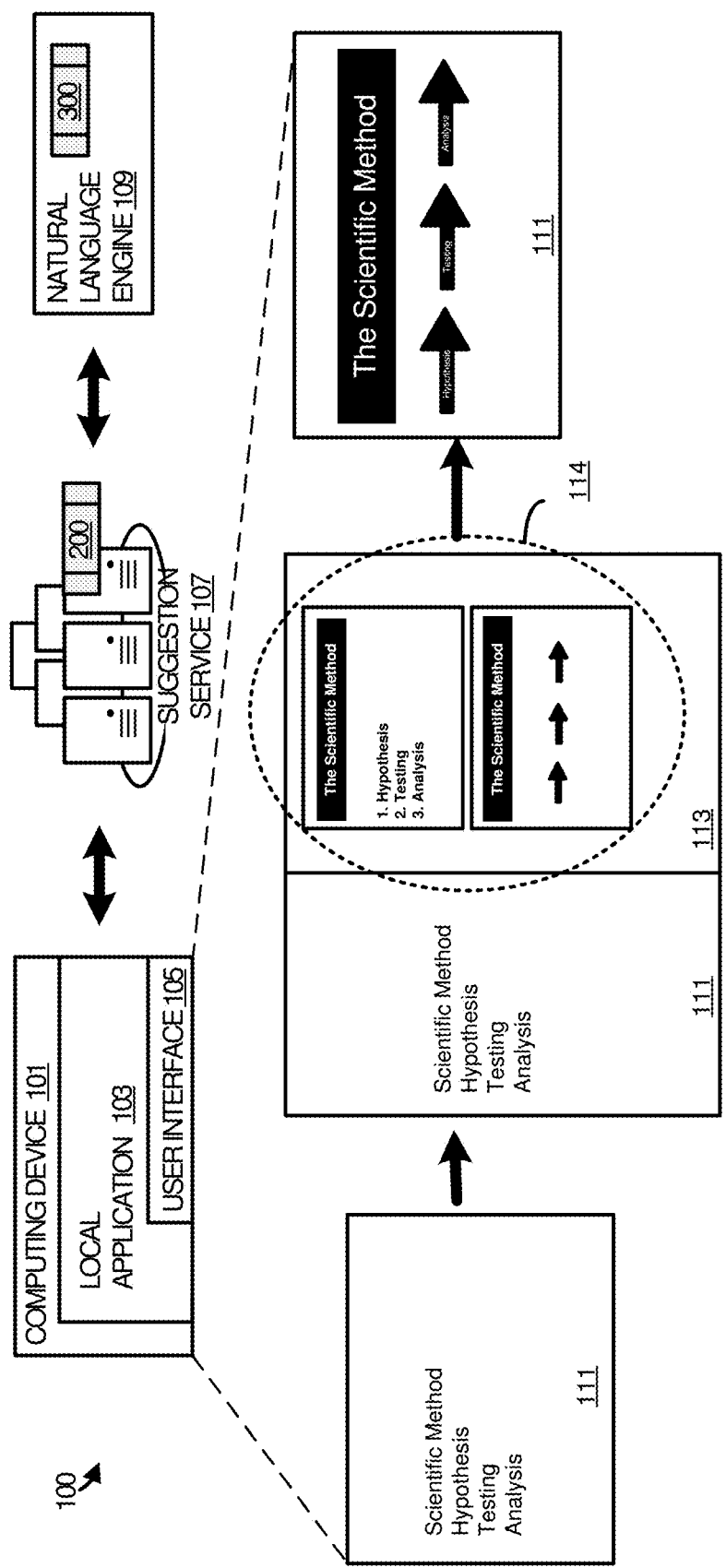
FIG. 1 illustrates an operational scenario in an implementation of a suggestion service to provide a suggested diagrammatic representation of textual information.

Technology is disclosed herein for enhancing the digital representation of textual information. For example, a user creating a presentation on a topic may create one or more slides in a presentation program. The user may start by entering text onto a blank slide.

The user may wish to create a diagrammatic representation of the entered text, such as, such as a graphical list, process, cycle, hierarchy, relationship, matrix, or pyramid. Rather than manually creating the graphic, the user may instead invoke the disclosed suggestion service in order to quickly and easily format the entered text into a suggested diagrammatic representation. For example, the user may select an icon for the suggestion service in the menu bar of the presentation program. In response, the program communicates with the suggestion service to obtain one or more suggested diagrammatic representations of the information in the text.

In order to provide suggested diagrammatic representations for the entered text, the suggestion service first determines the type of textual information entered by the user. In other words, the suggestion service determines a possible visual representation for the entered text. For example, the suggestion service determines if the text entered by the user constitutes a list, a chart, a timeline, or some other type of textual information. The suggestion service may use a natural language extractor to determine the type for the entered text. For example, the natural language engine may parse the entered text and determine the user has entered a list based on the carriage return pressed after each word.

The suggestion service identifies a layout for the suggested diagrammatic representation based on determination that the entered text constitutes a list. The suggestion service generates one or more suggested diagrammatic list representations of the entered text. For example, the various suggested diagrammatic representations may have different bullets and indentations, in addition to other formatting.

The suggestion service transfers the suggested diagrammatic representations to the presentation program. The suggested diagrammatic representations may appear in a separate panel adjacent to the panel where the user entered the text. The user may than select one of the one or more suggested diagrammatic representations presented.

In an implementation, a suggestion service is invoked to provide one or more suggested diagrammatic representations of textual information. Suggested diagrammatic representations may be surfaced that are based on the textual information of a content item created in a local application, such as a slide created in a presentation program. Such technology may be applicable to other types of content items in addition to presentation slides, such as word processing documents, spreadsheets, and the like.

The suggested diagrammatic representations may be dynamically changed based on new textual information as the user enters it into the content item. The layout of the suggested diagrammatic representations may vary based on the type of the textual information in the content item. For example, suggested diagrammatic representations may depict textual information in a chart, process, timeline, or list based on the type of textual information that is identified. In addition, textual information associated with a title component may be formatted differently than the textual information associated with a body component of a slide. For example, the textual information included in the title component may be bolded and in a larger font than the textual information included in the body component. Additionally, the content of the suggested diagrammatic representations may be edited by the user.

FIG. 1 illustrates an operational scenario of local application 103 that calls suggestion service 107 employing process 200 and/or 300 to provide enhanced visual representations of textual information. Local application 103 runs on computing device 101. For example, local application 103 may be a presentation program or some other productivity application, such as a word processing or spreadsheet application. In one example, computing device 101 may include a client computing device. In a basic configuration, computing device 101 may be personal computer having user interface 105 comprising both input elements and output elements. Computing device 101 may be any suitable computing device for executing local application 103. For example, computing device 101 may be at least one of: a personal computer; a desktop computer; a laptop computer; a gaming device/computer (e.g., Xbox®); a television; a smart phone; a tablet; a phablet; a smart watch; a wearable computer; etc. This list is exemplary only and should not be considered as limiting. Any suitable client computing device for executing local application 103 may be utilized.

A user interacts with local application 103 using user interface 105. For example, the user may create and edit content items, such as slides, in local application 103 using user interface 105. In one example, user interface 105 comprises a means for input and output, such as a keyboard, mouse, and/or touch screen. Suggestion service 107 and natural language engine 109 may reside on a cloud service. Local application 103, suggestion service 107, and natural language engine 109 may communicate over a network such as the Internet.

The user enters text onto a presentation slide, as illustrated by slide 111. After entering the text, the user invokes suggestion service 107. Suggestion service 107 receives the request for a suggested diagrammatic representation. In order to provide suggested diagrammatic representations for the entered text, suggestion service 107 must determine the type of the textual information entered by the user. For example, suggestion service 107 determines if the text entered by the user constitutes a list, a chart, a timeline, process, or some other type of textual information. Suggestion service 107 may invoke natural language engine 109 to parse the entered text to determine the type of the textual information entered on slide 111.

Suggestion service 107 identifies a layout for the suggested diagrammatic representation based on type of the textual information. Suggestion service 107 generates one or more suggested diagrammatic list representations of the entered text. Suggestion service 107 transfers suggested diagrammatic representations 114 to the presentation program, as displayed in panel 113, which is adjacent to the panel containing slide 111. The user may than select one of suggested diagrammatic representations 114.

Figure 2:
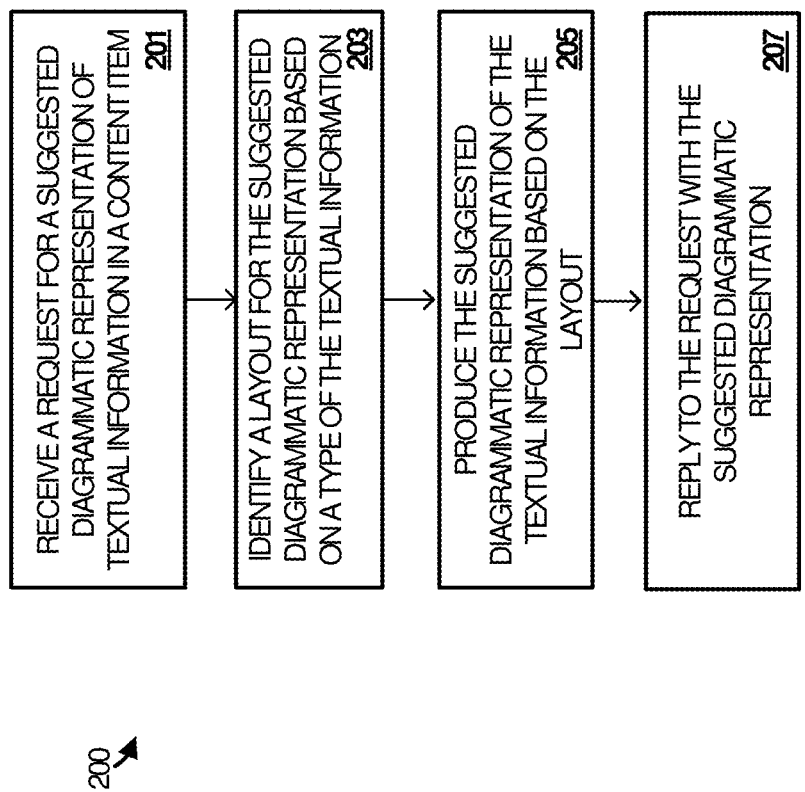
FIG. 2 illustrates a process employed by the suggestion service in an implementation.

Referring briefly to the steps illustrated in FIG. 2, suggestion service 107 provides suggested diagrammatic representations of textual information. For example, a user in local application 103 may add, delete, and/or edit the textual information in a content item, such as a slide in a presentation program, by adding text or any other type of textual information. The user may then request a suggested diagrammatic representation of the entered textual information by invoking suggestion service 107. For example, the user may click an icon for suggestion service 107 in the menu bar of the presentation program. Suggestion service 107 may also be invoked when a user navigates to a particular menu, view, or other portion of user interface 105 that includes the service. In other examples, suggestion service 107 may be triggered automatically, for instance after the user enters two or more consecutive bullets or newline commands. The suggested diagrammatic representations may be dynamically generated as the user enters the textual information. The suggested diagrammatic representations may also dynamically change as the user edits, enters, or deletes the textual information in the content item.

If suggestion service 107 is invoked by way of user input or otherwise, suggestion service 107 receives a request for a suggested diagrammatic representation of textual information in a content item (step 201). In some examples, local application 103 sends the text content and metadata associated with the content item to suggestion service 107. Suggestion service 107 may process the textual information using process 300. In other examples, natural language engine 109 employs process 300. Although not required, suggestion service 107 may regenerate the content item using the text content and the metadata and extract the textual information. In another example, suggestion service 107 may transfer the text content received from local application 103 directly to natural language engine 109. Natural language engine 109 employs process 300 or some other natural language parsing algorithm to determine the type of the textual information. For example, natural language engine 109 parses the textual information to determine if the type of the textual information comprises a list, chart, timeline, or process. Natural language engine 109 may interpret the text (including inputs such as carriage returns, new lines, tabbing, etc.) and/or formatting to determine the type of the textual information. Natural language engine 109 returns the determined type to suggestion service 107.

Suggestion service 107 identifies a layout for the suggested diagrammatic representation based on the type of the textual information (step 203). For example, if the textual information comprises a chart, suggestion service 107 may include a database of visual representations or graphics for charts, such as templates for bar charts and pie charts. Suggestion service 107 selects the visual representations from the database and incorporates the user entered textual information into the selected visual representations. In one example, if the textual information comprises a chart, suggestion service 107 extracts the chart data from the textual information and inserts the chart data into the selected chart visual representation(s).

Suggestion service 107 produces the suggested diagrammatic representation of the textual information based on the layout (step 205). For example, if the suggestion service is invoked in the context of a presentation program, the suggestions service may produce one or more slides that have different formatting, SmartArt®, etc. to visually enhance the textual information entered by the user. Suggestion service 107 replies to the request with the suggested diagrammatic representation(s) (step 207).

Figure 3:
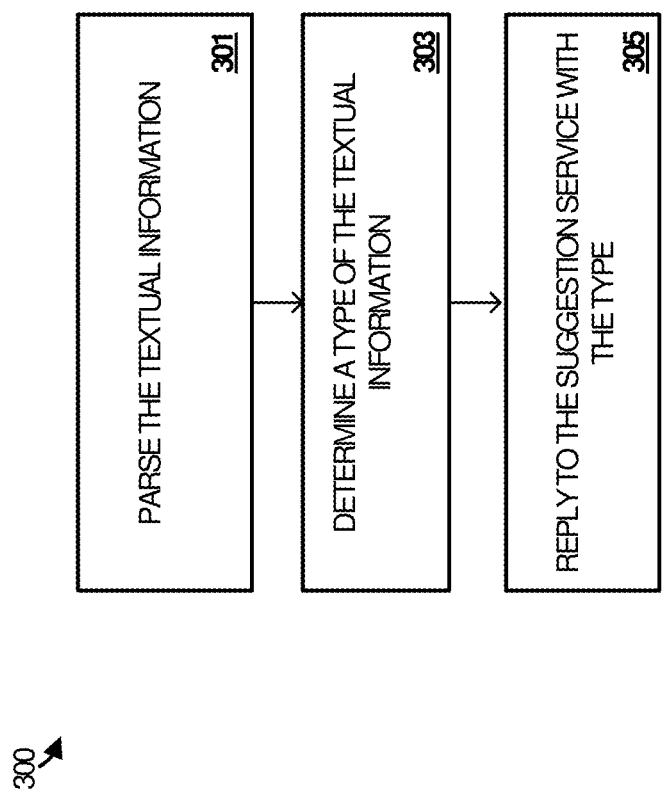
FIG. 3 illustrates another process that may be employed by the suggestion service in an implementation.

FIG. 3 illustrates process 300 to parse the textual information to determine a type of the textual information in order to provide the suggested diagrammatic representation(s). Process 300 may be employed by natural language engine 109, although in some examples, process 300 may be completed by suggestion service 107.

For example, natural language engine 109 parses the textual information (step 301). For example, natural language 109 may interpret the entered textual information. In addition to the entered text, natural language engine 109 may also interpret non-textual inputs such as carriage returns, new lines, and tabs. Natural language engine 109 determines a type of the textual information (step 303). In one example, natural language engine 109 may determine the textual information comprises a list based on the carriage returns entered after each item. In another example, natural language engine 109 determines that the textual information comprises chart data, based on the textual information including the "%" character. Natural language engine 109 replies to suggestion service 107 with the type of the textual information (step 305). In some examples where suggestion service 107 performs all or some of process 300, step 305 may be omitted.

Referring back to Figure 1and operational scenario 100, a user interacts with local application 103 to request a suggested diagrammatic representation. Operational scenario 100 is representative of one implementation of suggestion service 107 and natural language engine 109 executing process 200 and process 300.

A user on device 101 enters textual information on content item 111 of local application 103 using user interface 105. After entering the textual information, the user selects an icon in the menu. The selected icon relates to suggestion service 107 and prompts local application 103 to communicate with suggestion service 107. For example, the user may click an icon in user interface 105. In other examples, suggestion service 107 is automatically triggered. In response to the user selection or other trigger of suggestion service 107, a request for a suggested diagrammatic representation of the textual information in content item 111 is sent to suggestion service 107. The request and textual information may be transferred using Web and/or Representational State Transfer (REST) services.

In some examples, content item or presentation slide 111 includes different components, such as title, body, header, footer, etc. The textual information may include information or metadata indicating the associated component. Although not required, the textual information may be transmitted to suggestion service 107 over a communication network such as the Internet, intranet, or some other type of communication network.

Natural language engine 109 employs process 300 as follows. Natural language engine 109 parses the textual information and determines a type for the textual information. In one example, natural language engine 109 may parse the textual information to look for words, characters, or non-textual input that can be used to determine the type of the textual information. For instance, if the textual information includes chronological date information (i.e. Jul. 1, 2017; Jul. 4, 2017, etc.) natural language engine 109 may determine that the textual information is a timeline type. In another example, natural engine 109 parses the textual information and parses the following characters: "1," "2," "3," etc. natural language engine 109 determines the textual information is a list or process type. Natural language engine 109 may reply to suggestion service 107 with both types, or natural language engine 109 may look for other indicators of the type of the textual information. Natural language engine 109 replies to suggestion service 107 with the determined type for the textual information.

Suggestion service 107 identifies a layout for the suggested diagrammatic representation(s) based on the type of the textual information returned from natural language engine 109. As illustrated, the textual information comprises a list, suggestion service 107 then identifies layouts for a list. For example, suggestion service 107 may include a database of that includes different images and/or templates for different types, such as a list, process, chart, or timeline. User interface 105 of local application 103 now includes content item 111 and panel 113 that displays suggested diagrammatic representations 114.

Suggestion service 107 produces suggested diagrammatic representations 114 of the textual information based on the list layout. In some examples, suggestion service 107 transfers metadata for the suggested diagrammatic representations to local application 103, which uses the metadata to generate or render suggested diagrammatic representations 114. Although two suggested diagrammatic representations are illustrated, it is understood that more or fewer suggested diagrammatic representations may be provided.

For example, suggestion service 107 may extract and insert the textual information into one or more list templates included in the database of diagrammatic representations. The different diagrammatic representations include variations of presenting textual information and may include images and additional formatting. In some examples, suggestion service 107 extracts text from the different components of the content item and formats the text differently based on the associated component. For instance, the text associated with the title component may be added to a title bar formatted as shown. Additionally, suggestion service 107 may extract key data, such as dates, percentages, numbers, and/or other textual information for insertion into the suggested diagrammatic representation(s).

Suggestion service 107 replies to the request with suggested diagrammatic representations 114. Although not required, suggested diagrammatic representations 114 provided by suggestion service 107 may be editable by the user. In other words, the suggested diagrammatic representation(s) is not merely a generated image or clipart. The user selects one of suggested diagrammatic representations 114, and local application 103 renders the selected suggested diagrammatic representation in content item 111.

Figure 4A:
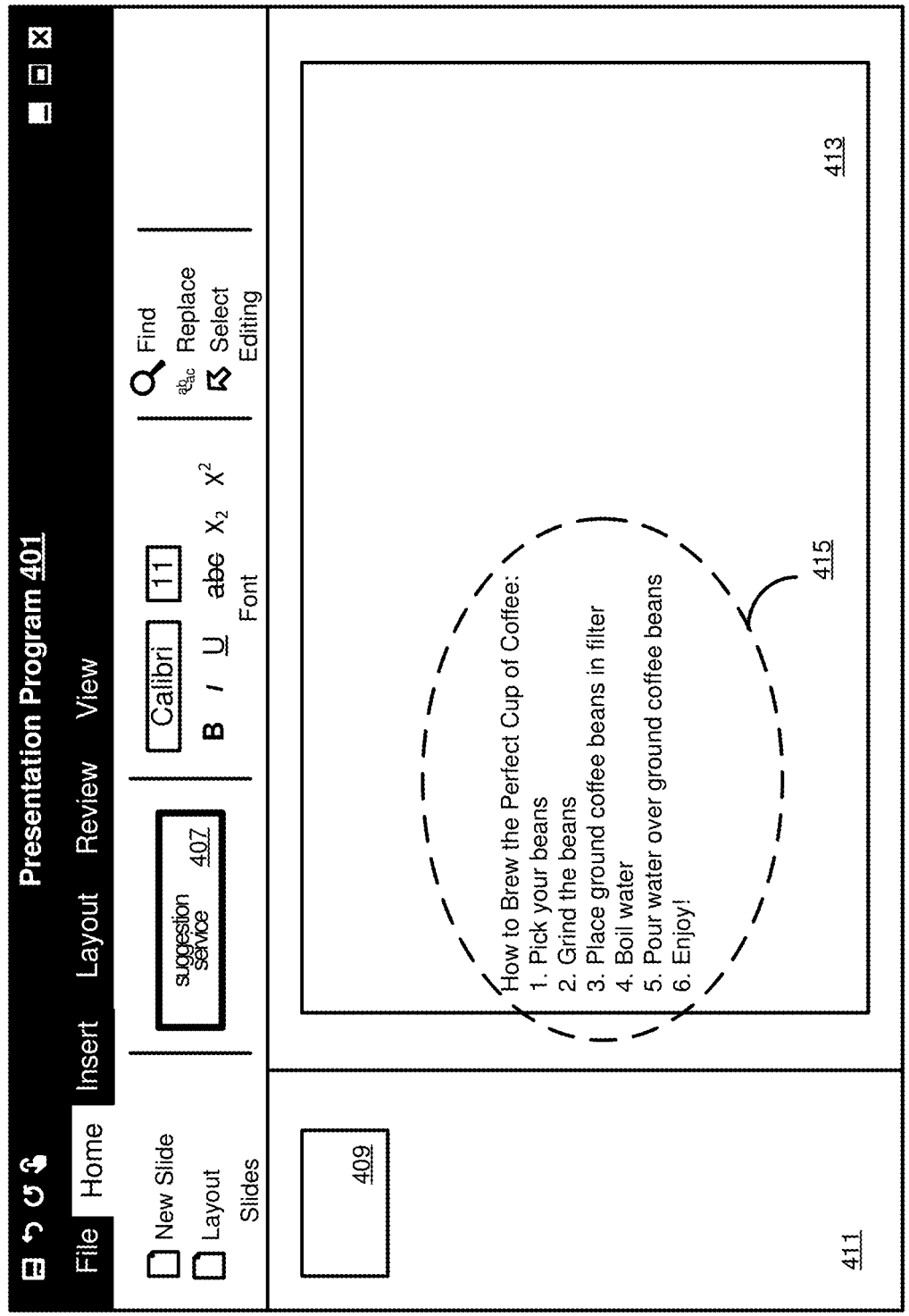
FIGS. 4A-E illustrate the operation of a suggestion service in a presentation program to provide a suggested diagrammatic representation of textual information.

FIG. 4A illustrates an operational scenario using presentation program 401 to provide suggested diagrammatic representations of textual information 415. Presentation program 401 is an example of local application 103 illustrated in FIG. 1. A user enters textual information 415 on slide 413. A preview panel 411 provides a brief thumbnail preview of the slides in a presentation deck. To begin, only preview 409 corresponding to slide 413 is in preview panel 411.

Presentation program 401 includes a menu from which a user may select various feature menus, including a file, home, insert, layout, review, and view menus. In this scenario, the home menu has been selected. The home menu includes various feature sets and a user interface element for suggestion service 407. When suggestion service 407 is invoked by user input, suggestion service 407 allows the user to request a suggested diagrammatic representation of textual information 415 entered on slide 413. Examples of user input include, but are not limited to, a touch, mouse click, spoken command, or any other user input.

In response to the user selecting the user interface element for suggestion service 407 (as indicated by the bolded line around suggestion service 407), presentation program 401 sends a request for a suggested diagrammatic representation to suggestion service 407. In other examples, suggestion service 407 may be triggered automatically when textual information is detected or after a certain amount of textual information is entered.

Figure 4B:
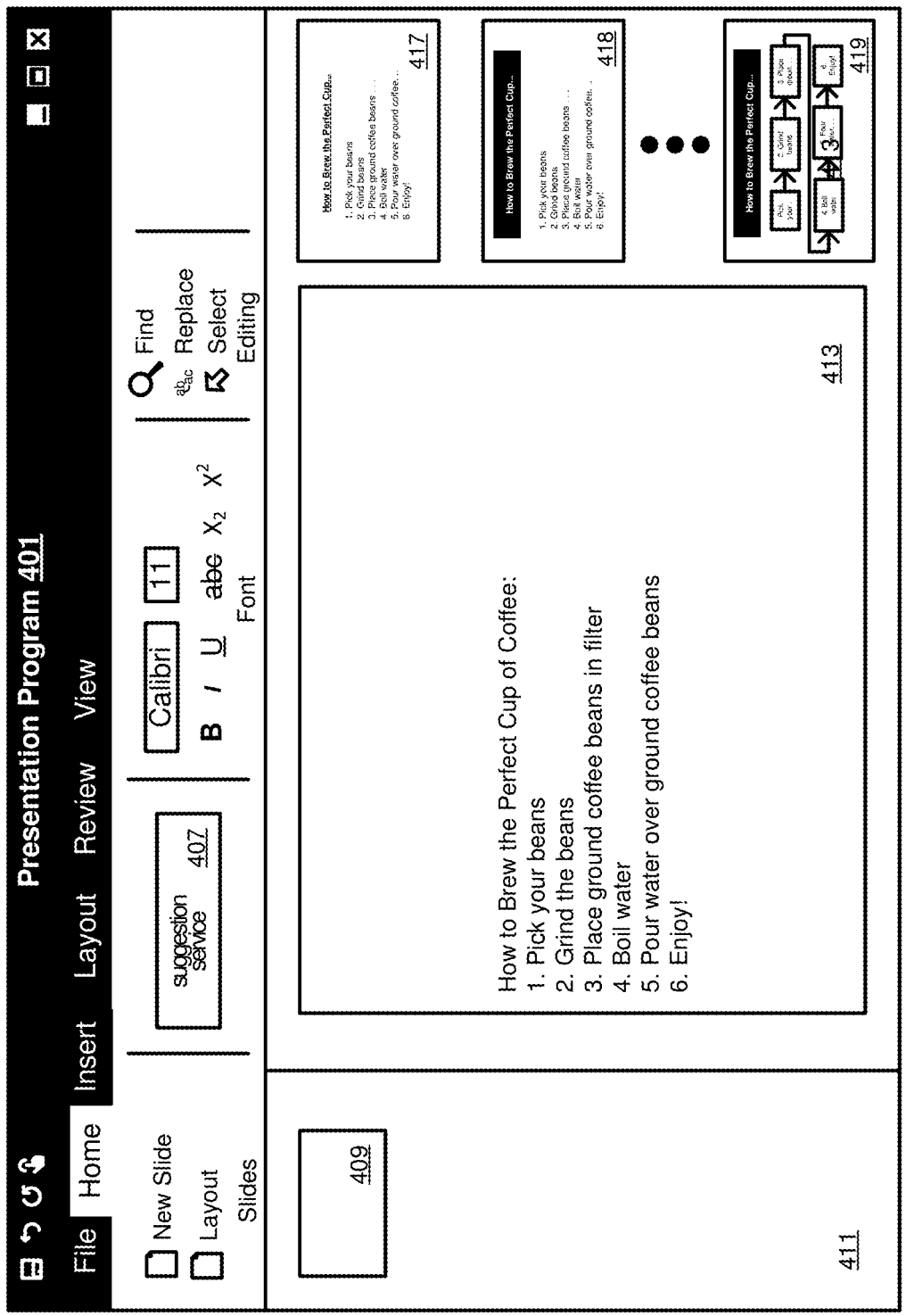

FIG. 4B continues the illustration of the operational scenario in FIG. 4A to provide the suggested diagrammatic representation 417-419 of textual information 415. Suggestion service 407 receives the request and identifies a layout for the suggested diagrammatic representation based on the type of textual information 415. For example, a natural language algorithm determines that textual information 415 entered by the user comprises a process (i.e. list of steps). Suggestion service 407 produces suggested diagrammatic representations 417-419 of textual information 415 based on the process layout. The suggestion service replies to the request with the suggested diagrammatic representations 417-419. For example, suggestion service 407 may transfer metadata to presentation program 401, which uses the metadata to generate the slides with the suggested diagrammatic representations.

Figure 4C:
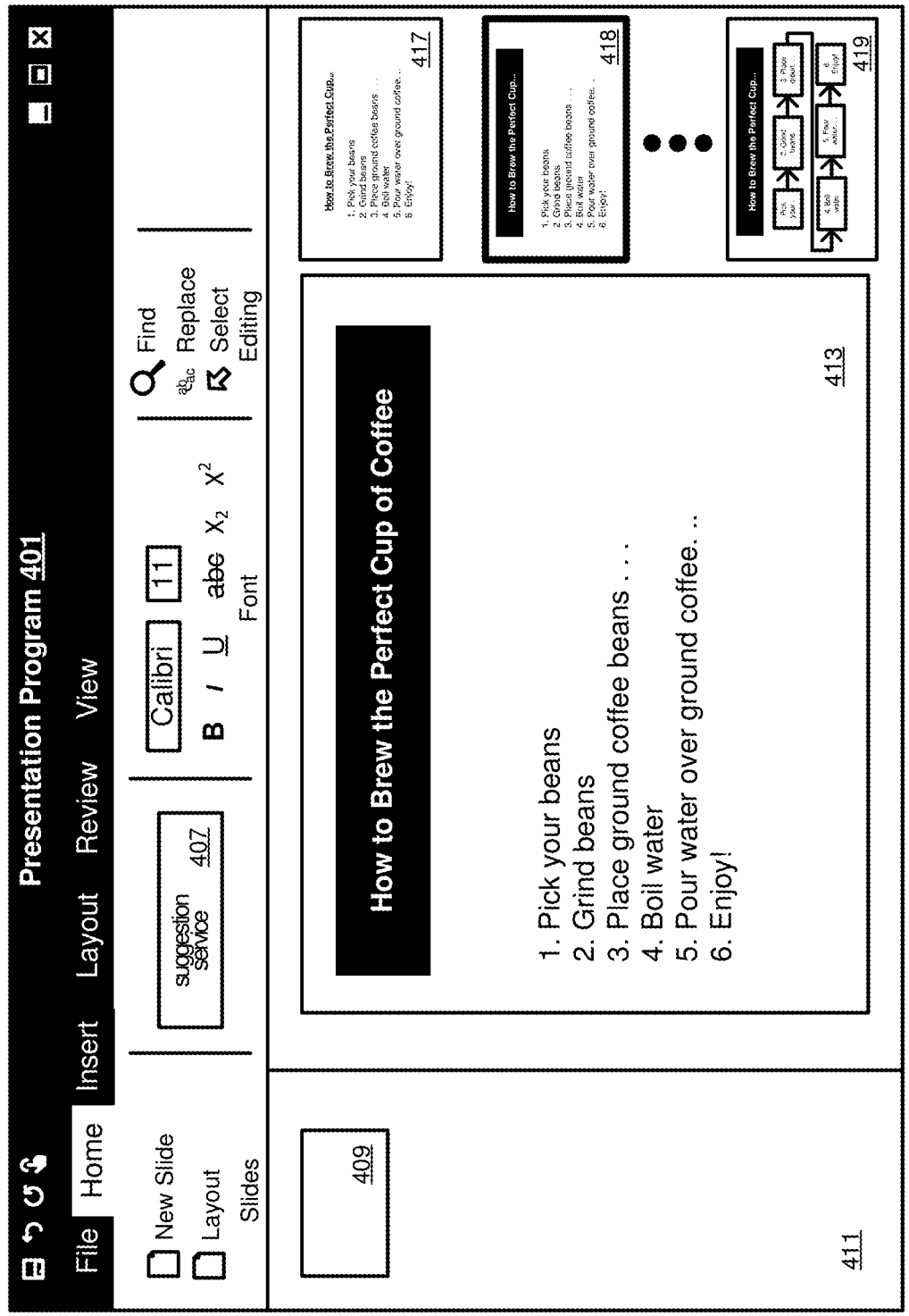
Figure 4D:
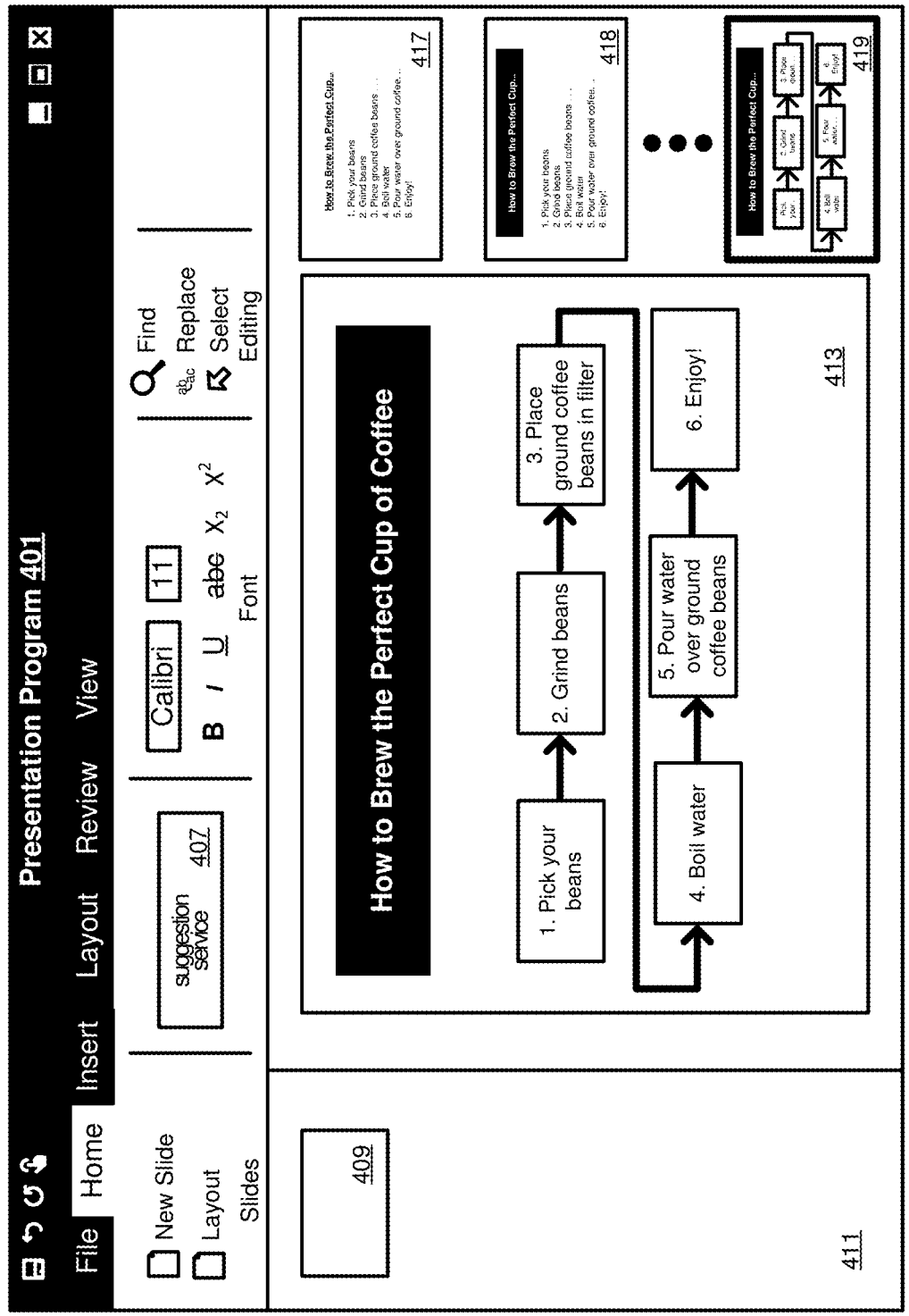
Figure 4E:
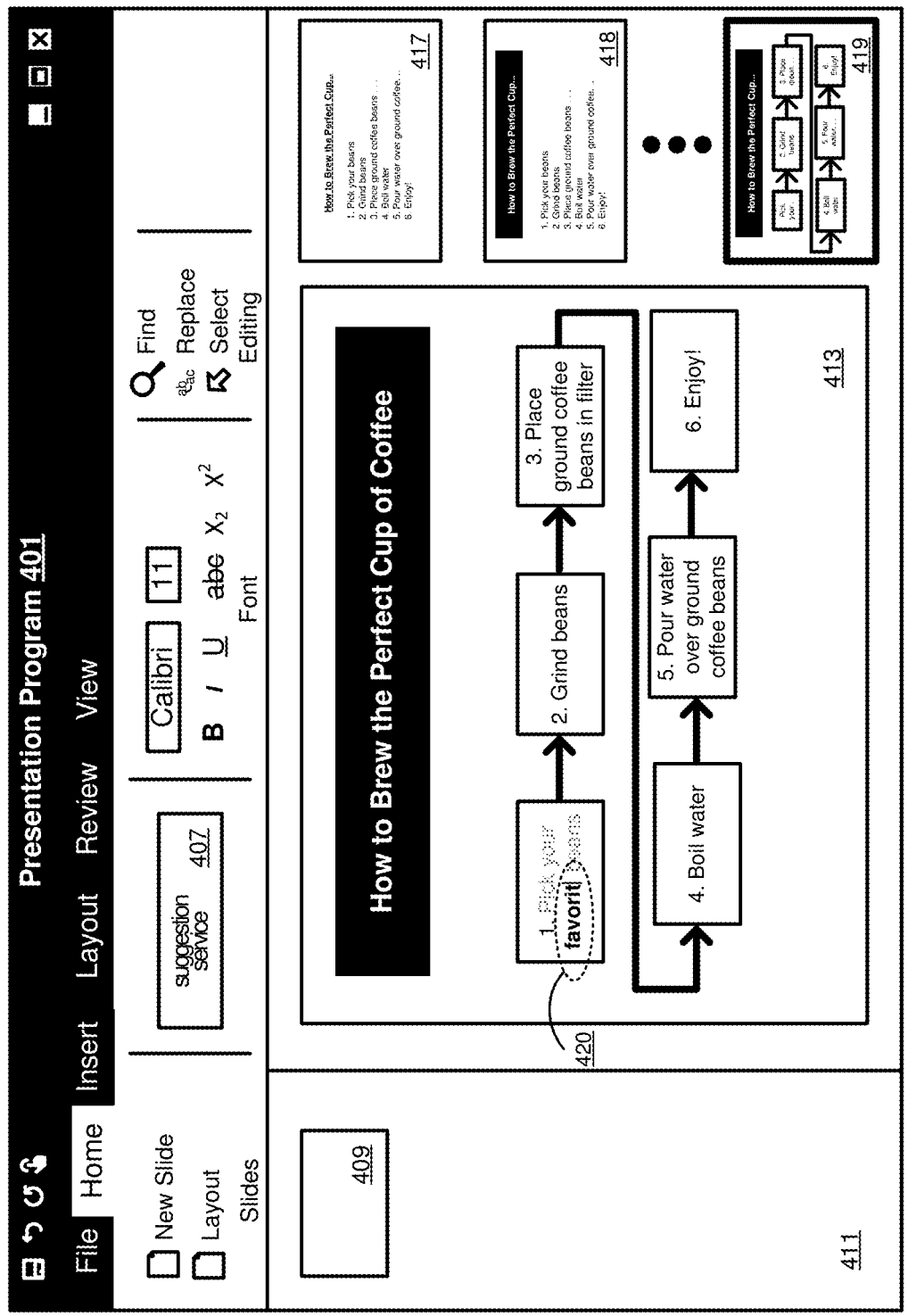

FIG. 4C illustrates user's initial selection of suggested diagrammatic representation 418 to replace textual information 415. Suggested diagrammatic representation 418 is rendered on slide 413. In FIG. 4D, the user changes his or her selection to suggested diagrammatic representation 419, and suggested diagrammatic representation 419 is rendered in slide 413. FIG. 4E illustrates a user editing suggested diagrammatic representation 419, as shown user enters new text 420 into suggested diagrammatic representation 419. In addition, the user could rearrange the boxes or perform other edits of suggested diagrammatic representation 419.

Figure 5A:
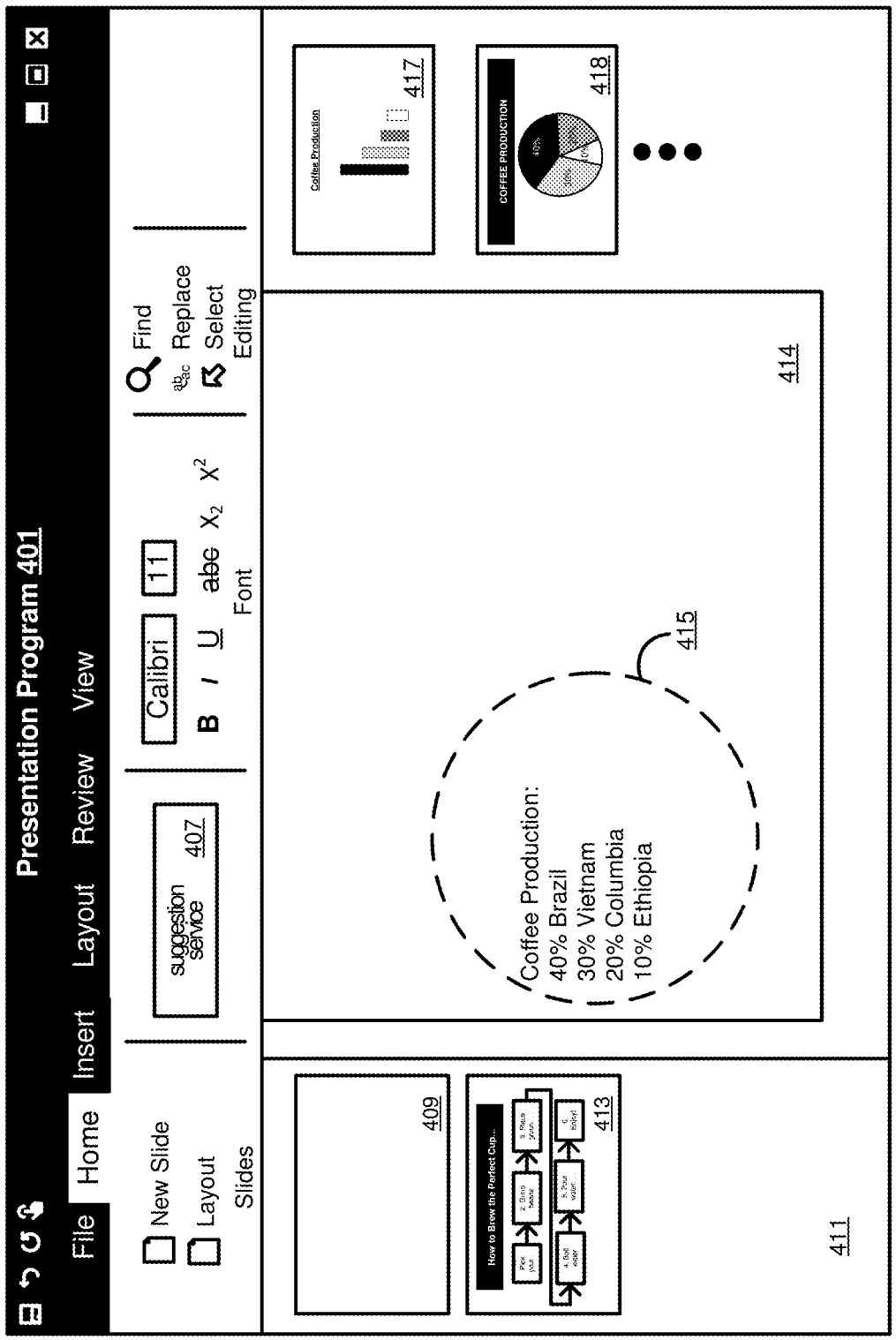
FIGS. 5A-B illustrate another operation of the suggestion service in the presentation program to provide one or more suggested diagrammatic representation(s).

FIG. 5A illustrates another operational scenario in presentation program 401 to provide enhanced visual representations of the textual information the user enters on a second slide.

The user enters textual information 415 on slide 414. Preview panel 411 provides a brief thumbnail preview of the slides in a presentation deck. Preview panel 411 includes preview 409 of slide 414 and previously created slide 413 from FIGS. 4A-4E.

In response to the user selecting the icon or menu item for suggestion service 407, presentation program 401 sends a request for a suggested diagrammatic representation to suggestion service 407. In some examples, suggestion service 407 will automatically provide the suggested diagrammatic representations after the user enters a certain amount of text since suggestion service 407 was previously invoked, as illustrated in FIG. 4A.

Suggestion service 407 receives the request and identifies a layout for the suggested diagrammatic representation based on the type of textual information 415. In FIG. 5A, the natural language processing algorithm determines that textual information 415 comprises information relating to a chart. The suggestion service produces suggested diagrammatic representations 417-418 of textual information 415 based on the chart layout. Suggestion service 407 replies to the request with suggested diagrammatic representations 417-418.

Figure 5B:
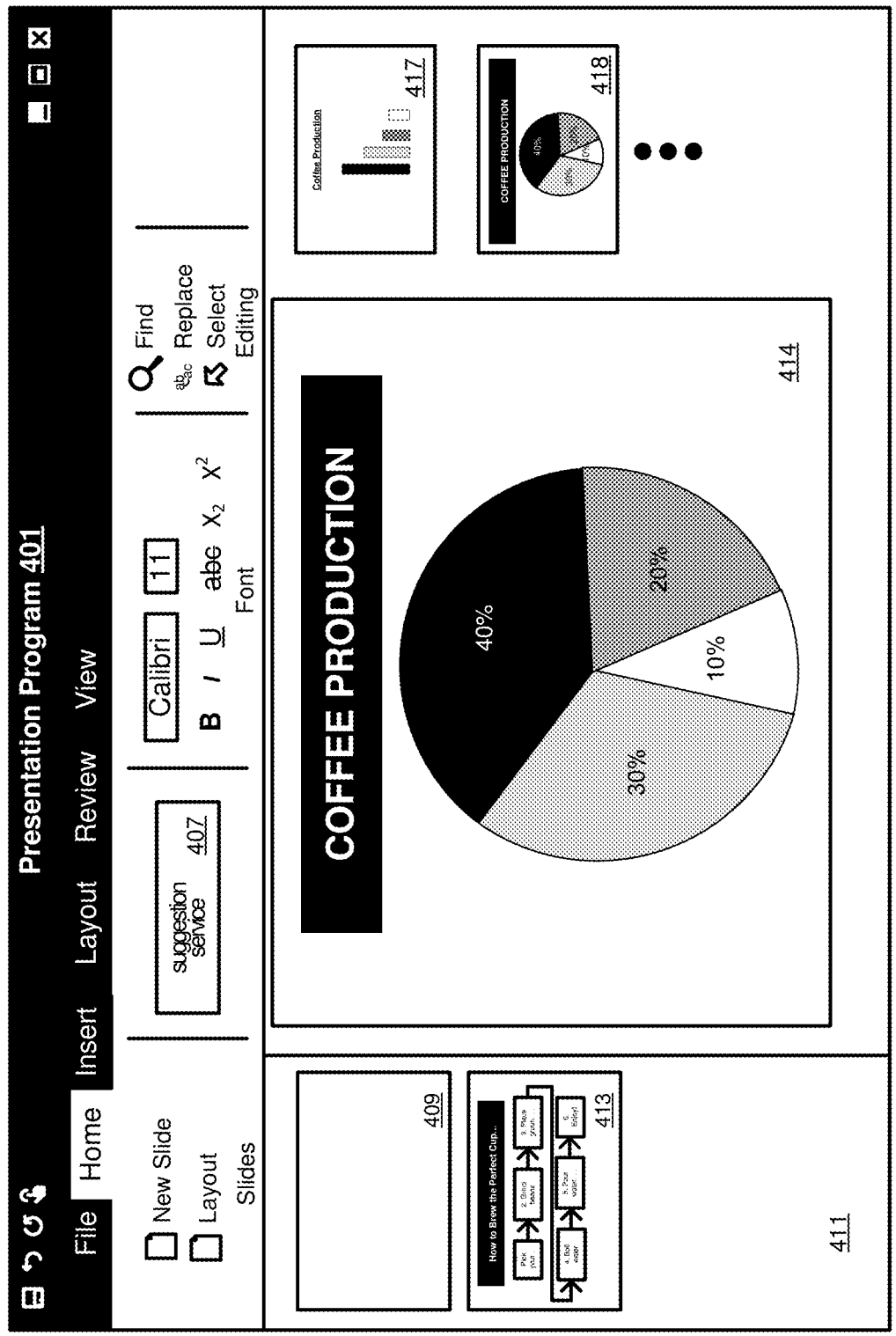

FIG. 5B continues the illustration of the operational scenario in FIG. 5A to provide the suggested diagrammatic representation of textual information 415. The user selects suggested diagrammatic representation 418 to replace textual information 415. Suggested diagrammatic representation 418 is rendered on slide 414, where the user may edit and/or add images and/or additional textual information. Although not required, suggestion service 407 may employ machine learning and track users' selection of the suggested diagrammatic representations. For example, suggestion service 407 may track statistics on how often a user selects a presented suggested diagrammatic representation, which of the presented diagrammatic representation is selected. Using such data, suggestion service 407 may make determinations on such things as the accuracy of determining the type of textual information. In addition, based on such determinations, suggestion service 407 and/or the natural language engine may make create a database used to analyze the textual information.

Various technical effects may be appreciated with respect to the suggestion service disclosed herein. For example, providing a user with suggestion diagrammatic representations of textual information provides a better user experience by eliminating the need to learn complex functions of local applications. In another example, identifying and producing suggested diagrammatic representations may reduce the time required to format and create diagrams to represent textual information. In the aggregate, such a streamlined design flow may conserve device resources, such as processing cycles, display resources, and battery life.

Figure 6:
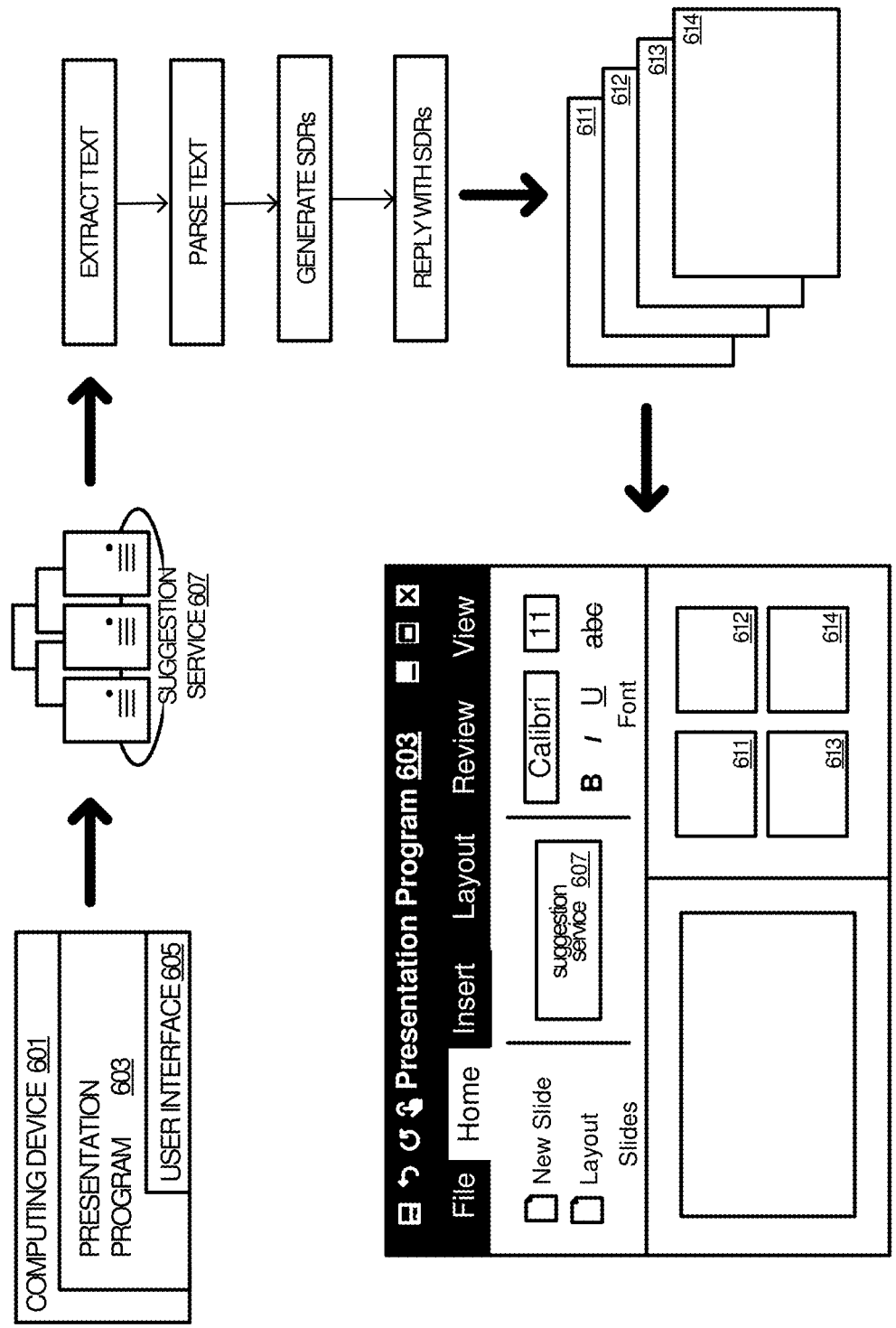
FIG. 6 illustrates an operational diagram for the implementation of the suggestion service to provide suggested diagrammatic representation(s).

FIG. 6 illustrates a design diagram for the implementation of suggestion service 607 to provide suggested diagrammatic representations 611-614 in presentation program 603. Suggestion service 607 is an example of suggestion service 107 and 407 in the proceeding figures, although suggestion service 107 and 407 may be implemented in alternative configurations.

A user on device 601 enters textual information on a content item in presentation program 603. After entering the textual information, the user selects or activates suggestion service 607. For example, the user may click an icon in user interface 605. In other examples, suggestion service 607 is automatically triggered. In response to the user selection or other trigger of suggestion service 607, a request for a suggested diagrammatic representation of the textual information is sent to suggestion service 607. The request and textual information may be transferred using Web and/or Representational State Transfer (REST) services.

Suggestion service 607 employs the following process: extract text, parse text, generate suggested diagrammatic representations (SDRs), and reply with SDRs 611-614. SDRs 611-614 are transferred to presentation program 603. Presentation program 603 renders suggested diagrammatic representations 611-614 to user in user interface 605.

Figure 7:
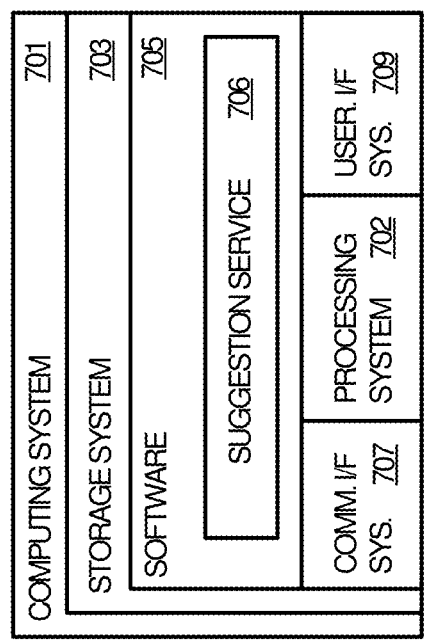
FIG. 7 illustrates a computing system suitable for implementing the suggestion service disclosed herein, including any of the architectures, elements, processes, and operational scenarios and sequences illustrated in the Figures and discussed below in the Technical Disclosure.

FIG. 7 illustrates computing system 701 operating as described in process 200 and process 300. Computing system 701 is representative of any system or collection of systems in which the various applications, services, scenarios, and processes disclosed herein may be implemented. Examples of computing system 701 include, but are not limited to, server computers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes suggestion service 706, which is representative of suggestion service 107 and 407 discussed with respect to the preceding Figures. When executed by processing system 702 suggestion service 706 executes to provide suggested diagrammatic representations of textual information, software 705 directs processing system 702 to operate as described herein for at least the various processes, operational scenarios, and sequences discussed in the foregoing implementations to provide enhanced visual representations of textual information. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing a suggestion service to provide suggested diagrammatic representations of textual information in content.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include suggestion service 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to provide the suggestion service. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface to present a user interface to a local program as discussed herein, such as user interface 105, or any other user interface to a productivity application.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1

A method of operating a suggestion service to provide suggested diagrammatic representations of textual information included in content, the method comprising: receiving a request for a suggested diagrammatic representation of the textual information included in a content item; identifying a layout for the suggested diagrammatic representation based on a type of the textual information; producing the suggested diagrammatic representation of the textual information based on the layout; and replying to the request with the suggested diagrammatic representation.

Example 2

The method of Example 1 further comprising a natural language engine parsing the textual information.

Example 3

The method of Examples 1-2 further comprising the natural language engine determining the type of the textual information.

Example 4

The method of Examples 1-3 further comprising the natural language engine replying to the suggestion service with the type of the textual information.

Example 5

The method of Examples 1-4 wherein replying to the request with the suggested diagrammatic representation comprises transferring metadata to generate the suggested diagrammatic representation.

Example 6

The method of Examples 1-5 wherein identifying the layout for the suggested diagrammatic representation based on the type of the textual information comprises: determining whether the layout comprises a list; determining whether the layout comprises a process; determining whether the layout comprises a timeline; and determining whether the layout comprises a chart.

Example 7

The method of Examples 1-6 further comprising: identifying key information in the textual information; extracting the key information from the textual information; and inserting the key information in the suggested diagrammatic representation.

Example 8

A computing apparatus comprising: one or more computer readable storage media; a processing system operatively coupled with the one or more computer readable storage media; and a local application including a suggestion service comprising program instructions stored on the one or more computer readable storage media that, when read and executed by the processing system, direct the processing system to at least: receive a request for a suggested diagrammatic representation of the textual information included in a content item; identify a layout for the suggested diagrammatic representation based on a type of the textual information; produce the suggested diagrammatic representation of the textual information based on the layout; and reply to the request with the suggested diagrammatic representation.

Example 9

The computing apparatus of Example 8 wherein the program instructions further direct the processing system to parse the textual information.

Example 10

The computing apparatus of Examples 8-9 wherein the program instructions further direct the processing system to determine the type of the textual information.

Example 11

The computing apparatus of Examples 8-10 wherein the program instructions further direct the processing system to reply to the suggestion service with the type of the textual information.

Example 12

The computing apparatus of Examples 8-11 wherein the program instructions further direct the processing system to: determine whether the layout comprises a list; determine whether the layout comprises a process; determine whether the layout comprises a timeline; and determine whether the layout comprises a chart.

Example 13

The computing apparatus of Examples 8-12 wherein the program instructions further direct the processing system to transfer metadata to generate the suggested diagrammatic representation.

Example 14

The computing apparatus of Examples 8-13 wherein the program instructions further direct the processing system to: identify key information in the textual information; extract the key information from the textual information; and insert the key information in the suggested diagrammatic representation.

Example 15

One or more computer readable storage media having a local application including a suggestion service stored thereon comprising program instructions that, when read and executed by a processing system, direct the processing system to at least: receive a request for a suggested diagrammatic representation of the textual information included in a content item; display the suggested diagrammatic representation; and receive a user selection of the suggested diagrammatic representation.

Example 16

The one or more computer readable storage media of Example 15 wherein the program instructions further direct the processing system to receive a user instruction to edit the selected suggested diagrammatic representation.

Example 17

The one or more computer readable storage media of Examples 15-16 wherein the program instructions further direct the processing system to edit the selected suggested diagrammatic representation based on the user instruction.

Example 18

The computing apparatus of Examples 15-17 wherein the request for the suggested diagrammatic representation includes the textual information and metadata included in the content item.

Example 19

The computing apparatus of Examples 15-18 wherein the content item comprises a presentation slide.

Example 20

The computing apparatus of Examples 15-19 wherein the content item comprises a word processing document.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a suggestion service to provide suggested diagrammatic representations of textual information in content, the method comprising:
in one or more computers:
receiving a request for at least a suggested diagrammatic representation of the textual information included in a content item;
sending a request to a natural language engine to identify a type of the textual information from a plurality of different types of textual information comprising at least one of a process type, a timeline type, a chart type, and a list type;

receiving a reply from the natural language engine that identifies the type of the textual information as at least one of the plurality of different types of textual information;

identifying which layout, of a plurality of different types of layouts, corresponds to the type of the textual information, wherein each of the different types of layouts corresponds to a different one of the plurality of different types of textual information;

producing the suggested diagrammatic representation of the textual information in the layout identified for the textual information; and replying to the request with the suggested diagrammatic representation in the layout;

wherein the plurality of different types of layouts comprises at least one of a process layout, a list layout, a timeline layout, and a chart layout, and wherein the layout comprises a one of the process layout, the list layout, the timeline layout, and the chart layout.

2. The method of claim 1 further comprising:
the natural language engine-parsing the textual information.

3. The method of claim 2 further comprising:
the natural language engine determining the type of the textual information by analyzing the textual information and non-textual inputs included in the content item.

4. The method of claim 1 wherein replying to the request with the suggested diagrammatic representation comprises transferring metadata to generate the suggested diagrammatic representation.

5. The method of claim 1 wherein producing the suggested diagrammatic representation of the textual information in the layout identified for the textual information comprises producing multiple suggested diagrammatic representations of the textual information in the layout.

6. The method of claim 1 further comprising:
identifying key information in the textual information;
extracting the key information from the textual information; and
inserting the key information in the suggested diagrammatic representation.

7. A computing apparatus comprising:
one or more computer readable storage media;
a processing system operatively coupled with the one or more computer readable storage media; and
program instructions stored on the one or more computer readable storage media for operating a suggestion service that, when read and executed by the processing system, direct the processing system to at least:
receive a request for at least a suggested diagrammatic representation of textual information included in a content item;
send a request to a natural language engine to identify a type of the textual information from a plurality of different types of textual information comprising at least one of a process type, a timeline type, a chart type, and a list type;
receive a reply from the natural language engine that identifies the type of the textual information as at least one of the plurality of different types of textual information;
identify which layout, of a plurality of different types of layouts, corresponds to the type of the textual information, wherein each of the different types of layouts corresponds to a different one of the plurality of different types of textual information;
produce the suggested diagrammatic representation of the textual information in the layout identified for the textual information; and
reply to the request with the suggested diagrammatic representation in the layout;
wherein the plurality of different types of layouts comprises at least one of a process layout, a list layout, a timeline layout, and a chart layout, and wherein the layout comprises a one of the process layout, the list layout, the timeline layout, and the chart layout.

8. The computing apparatus of claim 7 wherein the program instructions further direct the processing system to parse the textual information.

9. The computing apparatus of claim 8 wherein the program instructions further direct the processing system to determine the type of the textual information by analyzing the textual information and non-textual inputs included in the content item.

10. The computing apparatus of claim 7 wherein to produce the suggested diagrammatic representation of the textual information in the layout identified for the textual information comprises producing multiple suggested diagrammatic representations of the textual information in the layout.

11. The computing apparatus of claim 7 wherein the program instructions further direct the processing system to transfer metadata to generate the suggested diagrammatic representation.

12. The computing apparatus of claim 7 wherein the program instructions further direct the processing system to:
identify key information in the textual information;
extract the key information from the textual information; and
insert the key information in the suggested diagrammatic representation.

13. One or more non-transitory computer readable storage media having a local application including a suggestion service stored thereon comprising program instructions that, when read and executed by a processing system, direct the processing system to at least:
receive a request for at least a suggested diagrammatic representation of textual information included in a content item;
send a request to a natural language engine to identify a type of the textual information from a plurality of different types of textual information comprising at least one of a process type, a timeline type, a chart type, and a list type;
receive a reply from the natural language engine that identifies the type of the textual information as at least one of the plurality of different types of textual information;
identify which layout, of a plurality of different types of layouts, corresponds to the type of the textual information, wherein each of the different types of layouts corresponds to a different one of the plurality of different types of textual information;
display the suggested diagrammatic representation in the layout; and
receive a user selection of the suggested diagrammatic representation;
wherein the plurality of different types of layouts comprises at least one of a process layout, a list layout, a timeline layout, and a chart layout, and wherein the layout comprises a one of the process layout, the list layout, the timeline layout, and the chart layout.

14. The one or more non-transitory computer readable storage media of claim 13 wherein the program instructions further direct the processing system to:
 receive a user instruction to edit the selected suggested diagrammatic representation.

15. The one or more non-transitory computer readable storage media of claim 14 wherein the program instructions further direct the processing system to:
 edit the selected suggested diagrammatic representation based on the user instruction.

16. The one or more non-transitory computer readable storage media of claim 13 wherein the request for the suggested diagrammatic representation includes the textual information and metadata included in the content item.

17. The one or more non-transitory computer readable storage media of claim 13 wherein the content item comprises a presentation slide.

18. The one or more non-transitory computer readable storage media of claim 13 wherein the content item comprises a word processing document.

\* \* \* \* \*